United States Patent
Cohen et al.

(10) Patent No.: US 10,051,252 B1
(45) Date of Patent: Aug. 14, 2018

(54) METHOD OF DECAYING CHROMINANCE IN IMAGES

(71) Applicant: Filmic Inc., Seattle, WA (US)

(72) Inventors: Christopher Cohen, Seattle, WA (US); Matthew Voss, Seattle, WA (US)

(73) Assignee: FILMIC INC., Seattle, WA (US)

( * ) Notice: Subject to any disclaimer, the term of this patent is extended or adjusted under 35 U.S.C. 154(b) by 0 days.

(21) Appl. No.: 15/910,993

(22) Filed: Mar. 2, 2018

Related U.S. Application Data

(60) Provisional application No. 62/468,063, filed on Mar. 7, 2017, provisional application No. 62/468,874, filed on Mar. 8, 2017.

(51) Int. Cl.
*H04N 9/64* (2006.01)
*H04N 9/77* (2006.01)
*H04N 5/213* (2006.01)

(52) U.S. Cl.
CPC ............. *H04N 9/646* (2013.01); *H04N 5/213* (2013.01); *H04N 9/77* (2013.01)

(58) Field of Classification Search
CPC .......... H04N 9/646; H04N 9/77; H04N 5/213; H04N 5/357; H04N 5/21; G06T 5/002; G06T 5/00; G06T 5/001; G06T 7/00; G06K 9/40
See application file for complete search history.

(56) References Cited

U.S. PATENT DOCUMENTS

| | | | |
|---|---|---|---|
| 8,284,271 B2 | 10/2012 | Zimmer et al. | |
| 8,508,624 B1 | 8/2013 | Linzer | |
| 8,699,813 B2 | 4/2014 | Singh et al. | |
| 9,472,162 B2 | 10/2016 | Stauder et al. | |
| 9,525,804 B2 | 12/2016 | Baqai et al. | |
| 9,583,035 B2 | 2/2017 | Buckley et al. | |

(Continued)

FOREIGN PATENT DOCUMENTS

CN 104486607 4/2015

OTHER PUBLICATIONS

Garcia-Lamant, F., et al., "Segmentation of color images by chromaticity features using self organizing maps," Ingnieria e Investigacion, Aug. 2016, 36(2):78-89.

(Continued)

*Primary Examiner* — Michael Teitelbaum
(74) *Attorney, Agent, or Firm* — Davis Wright Tremaine LLP; Heather M. Colburn

(57) ABSTRACT

A method and system for decaying chrominance. One or more processors obtain a selected one of a series of root images of a digital video. The selected root image includes root pixels each associated with color values. The processor(s) selects one of the root pixels until each of the root pixels has been selected. The color values associated with the selected root pixel are expressible as a color vector with a plurality of elements each storing a different one of the color values. The processor(s) determines a perceptual luminance value for the selected root pixel, generates a monochromic vector for the selected root pixel, generates a biased monochromic vector by multiplying the monochromic vector with a bias, and generates new color values associated with a new pixel of a denoised image corresponding to the selected root pixel by blending the biased monochromic vector with the color vector.

20 Claims, 3 Drawing Sheets

(56) References Cited

U.S. PATENT DOCUMENTS

| | | |
|---|---|---|
| 9,659,349 B2 | 5/2017 | Douady-Pleven et al. |
| 2005/0025380 A1* | 2/2005 | Keshet ............... G06K 9/00127 382/260 |
| 2010/0092082 A1 | 4/2010 | Hirakawa et al. |
| 2010/0098348 A1* | 4/2010 | Zhang ..................... H04N 5/21 382/262 |
| 2014/0126808 A1 | 5/2014 | Geisler et al. |
| 2015/0350576 A1 | 12/2015 | Zimmer |
| 2016/0071251 A1 | 3/2016 | Thoma et al. |
| 2016/0328830 A1 | 11/2016 | Pouli et al. |

OTHER PUBLICATIONS

International Search Report and Written Opinion, dated May 2, 2018, received in International Application No. PCT/US2018/20921.

\* cited by examiner

METHOD OF DECAYING CHROMINANCE IN IMAGES

CROSS REFERENCE TO RELATED APPLICATIONS

This application claims the benefit of U.S. Provisional Application No. 62/468,063, filed on Mar. 7, 2017, and U.S. Provisional Application No. 62/468,874, filed on Mar. 8, 2017, both of which are incorporated herein by reference in their entireties.

BACKGROUND OF THE INVENTION

Field of the Invention

The present invention is directed generally to methods of reducing or removing chromatic noise in images and digital video.

Description of the Related Art

Luminance noise refers to fluctuations in brightness. Luminance noise may appear as light and dark specks (e.g., within a region of an image in which pixels should have the same or similar brightness). Chromatic or chroma noise refers to fluctuations in color. Chroma noise may appear as specks or blotches of unexpected color(s) (e.g., within a region of an image in which pixels should have the same or similar colors). Chroma noise is often more apparent in very dark or very light areas of an image and may give the image an unnatural appearance.

Image editing software often includes a user input (e.g., slider) that may be used to remove chroma noise manually. Software may also automatically remove chroma noise by decolorizing any pixels that have an unexpected color when compared to their neighboring pixels. Decolorized pixels are set to black, which essentially converts the chroma noise to luminance noise. Then, other image processing techniques may be applied to the image to remove the luminance noise and improve the overall appearance of the image.

BRIEF DESCRIPTION OF THE SEVERAL VIEWS OF THE DRAWING(S)

DETAILED DESCRIPTION OF THE INVENTION

Figure 1:
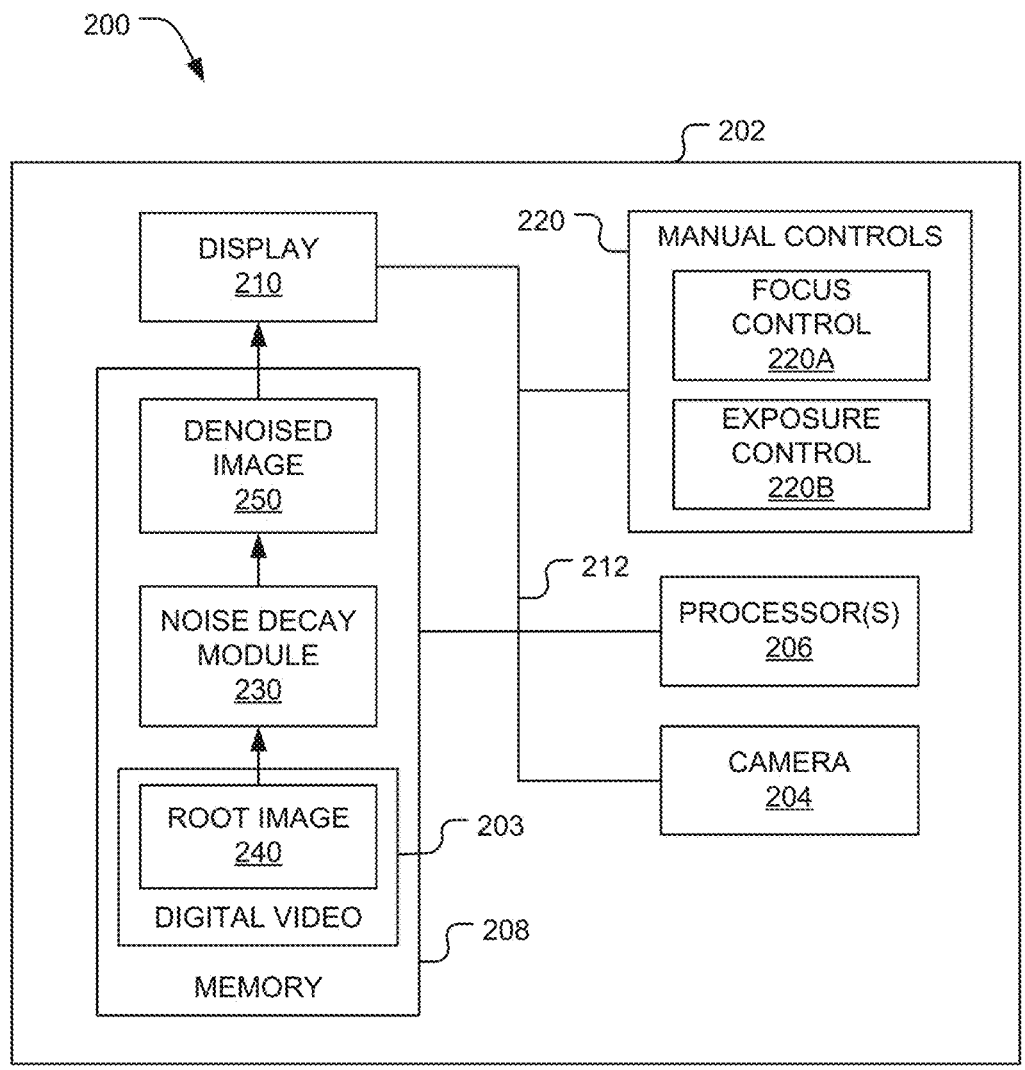
FIG. 1 is a functional block diagram of a video capture system.

FIG. 1 illustrates a video capture system 200 configured to capture digital video 203, which may be referred to as an image stream. For example, the digital video 203 may be captured and/or processed as a Real-Time Messaging Protocol ("RTMP") video stream. By way of a non-limiting example, the video capture system 200 may be implemented as a mobile communication device 140 (described below and illustrated in FIG. 3). The video capture system 200 includes a housing 202, a camera 204, one or more processors 206, memory 208, a display 210, and one or more manual controls 220. The camera 204, the processor(s) 206, the memory 208, and the display 210 may be connected together by a bus 212 (e.g., like a bus system 186 illustrated in FIG. 3).

The camera 204 is mounted on the housing 202. The camera 204 is configured to capture the digital video 203 and store that digital video 203 in the memory 208. The captured digital video 203 includes a series of root images (e.g., including a root image 240) of a scene. By way of a non-limiting example, the camera 204 may be implemented as a camera or video capture device 158 (see FIG. 3).

The processor(s) 206 is/are configured to execute software instructions stored in the memory 208. By way of a non-limiting example, the processor(s) 206 may be implemented as a central processing unit ("CPU") 150 (see FIG. 3) and the memory 208 may be implemented as memory 152 (see FIG. 3).

The display 210 is positioned to be viewed by the user while the user operates the video capture system 200. The display 210 is configured to display a preview of the digital video 203 being captured by the camera 204. By way of a non-limiting example, the display 210 may be implemented as conventional display device, such as a touch screen. The display 210 may be mounted on the housing 202. For example, the display 210 may be implemented as a display 154 (see FIG. 3). Alternatively, the display 210 may be implemented as an electronic viewfinder, an auxiliary monitor connected to the video capture system 200, and the like.

The manual control(s) 220 is/are configured to be operated by the user and may affect properties (e.g., focus, exposure, and the like) of the digital video 203 being captured. The manual control(s) 220 may be implemented as software controls that generate virtual controls displayed by the display 210. In such embodiments, the display 210 may be implemented as touch screen configured to receive user input that manually manipulates the manual control(s) 220. Alternatively, the manual control(s) 220 may be implemented as physical controls (e.g., button, knobs, and the like) disposed on the housing 202 and configured to be manually manipulated by the user. In such embodiments, the manual control(s) 220 may be connected to the processor(s) 206 and the memory 208 by the bus 212.

By way of non-limiting examples, the manual control(s) 220 may include a focus control 220A, an exposure control 220B, and the like. The focus control 220A may be used to change the focus of the digital video being captured by the camera 204. The exposure control 220B may change an ISO value, shutter speed, aperture, or an exposure value ("EV") of the digital video being captured by the camera 204.

The memory 208 stores a noise decay module 230 implemented by the processor(s) 206. In some embodiments, the noise decay module 230 may generate and display the virtual controls implementing the manual control(s) 220. Alternatively, the manual control(s) 220 may be implemented by other software instructions stored in the memory 208.

Figure 2:
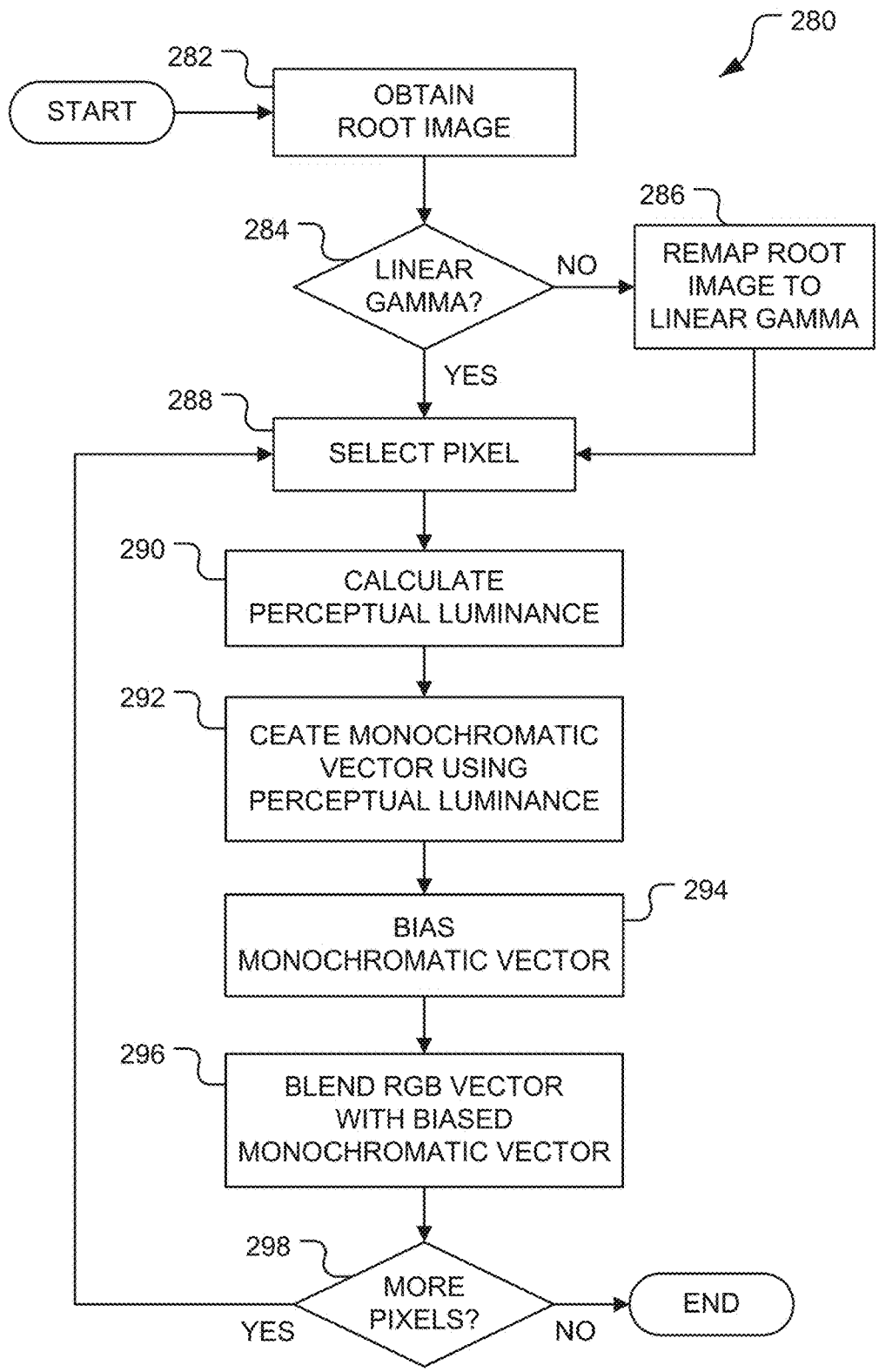
FIG. 2 is a flow diagram of a method of generating a denoised image performable by the video capture system.

FIG. 2 is a flow diagram of a method 280 performed by the noise decay module 230 (see FIG. 1). Referring to FIG. 1, the method 280 (see FIG. 2) generates the denoised image 250 from one of the series of root images of the digital video 203. For ease of illustration, the method 280 (see FIG. 2) will be described as generating the denoised image 250 from the root image 240.

In first block 282 (see FIG. 2), the noise decay module 230 obtains the root image 240 as a raw bitmap (e.g., directly the camera 204) before the root image 240 is encoded. The root image 240 includes a plurality of root pixels each associated with one or more color values within a color space (e.g., a standard Red Green Blue ("SRGB") color space). In this example, the RGB color values of each root pixel include separate values for red ("$R_{srgb}$"), green ("$G_{srgb}$"), and blue ("$B_{srgb}$"). However, through application of ordinary skill in the art to the present teachings, the method 280 may be adapted for use with other color spaces, such as HSL (Hue, Saturation, Lightness), HSV (Hue, Saturation, Value), and the like.

In decision block 284 (see FIG. 2), the noise decay module 230 determines whether the root image 240 has linearized gamma values. In other words, has the root image 240 not yet been gamma corrected? The decision in decision block 284 (see FIG. 2) is "YES," when the root image 240 has linearized gamma values, meaning the root image 240 not yet been gamma corrected. Otherwise, the decision in decision block 284 (see FIG. 2) is "NO."

When the decision in decision block 284 (see FIG. 2) is "YES," the noise decay module 230 advances to block 288 (see FIG. 2). On the other hand, when the decision in decision block 284 (see FIG. 2) is "NO," in block 286 (see FIG. 2), the noise decay module 230 remaps the root image 240 to linear gamma (e.g., using a shader or a lookup table). For example, if the root pixels are in the SRGB color space and the RGB values ($R_{srgb}$, $G_{srgb}$, and $B_{srgb}$) are scaled to range from 0 to 1, the following formulas may be used to obtain the linear RGB values ($R_{linear}$, $G_{linear}$, and $B_{linear}$) for each root pixel in the root image 240:

$$R_{linear} = \begin{cases} \dfrac{R_{srgb}}{12.92}, & R_{srgb} \leq 0.04045 \\ \left(\dfrac{R_{srgb} + 0.055}{1.055}\right)^{2.4}, & R_{srgb} > 0.04045 \end{cases} \quad \text{Eq. 1R}$$

$$G_{linear} = \begin{cases} \dfrac{G_{srgb}}{12.92}, & G_{srgb} \leq 0.04045 \\ \left(\dfrac{G_{srgb} + 0.055}{1.05}\right)^{2.4}, & G_{srgb} > 0.04045 \end{cases} \quad \text{Eq. 1G}$$

$$B_{linear} = \begin{cases} \dfrac{B_{srgb}}{12.92}, & B_{srgb} \leq 0.04045 \\ \left(\dfrac{B_{srgb} + 0.055}{1.055}\right)^{2.4}, & B_{srgb} > 0.04045 \end{cases} \quad \text{Eq. 1B}$$

Then, the noise decay module 230 advances to block 288 (see FIG. 2).

At this point, the noise decay module 230 processes each root pixel of the root image 240 one at a time. Thus, in block 288 (see FIG. 2), the noise decay module 230 selects one of the root pixels.

Then, in block 290 (see FIG. 2), the noise decay module 230 calculates a perceptual luminance ("p") for the selected root pixel. The perceptual luminance ("p") may be calculated by first calculating a relative luminance ("Y") for the selected root pixel. The relative luminance ("Y") refers to the brightness of the selected root pixel.

The relative luminance ("Y") of a particular pixel may be calculated using the following function in which a variable "s" represents the three linearized RGB color values ($R_{linear}$, $G_{linear}$, and $B_{linear}$) of the particular pixel expressed as an RGB vector:

$$Y = \text{dot}(s, \text{vec3}(0.2126, 0.7152, 0.0722))$$

$$\begin{aligned} Y &= [R_{linear}, G_{linear}, B_{linear}] \cdot [0.2126, 0.7152, 0.0722] \\ &= (R_{linear} \times 0.2126) + (G_{linear} \times 0.7152) + (B_{linear} \times 0.0722) \end{aligned} \quad \text{Eq. 2}$$

Using the above equation, the relative luminance ("Y") may be calculated for each pixel in a two-dimensional region of the root image 240 centered at the selected root pixel. For example, the region may be three pixels by three pixels. In this example, the selected root pixel may be characterized as being an origin of the region (which includes the root pixel and its eight surrounding neighbors) and assigned a coordinate value of (0, 0). Thus, a separate relative luminance value may be calculated for each of the eight root pixels neighboring the selected root pixel as well as for the selected root pixel. In this example, the following set of nine relative luminance values would be calculated: $Y_{(-1,-1)}$, $Y_{(-1,0)}$, $Y_{(-1,1)}$, $Y_{(0,-1)}$, $Y_{(0,0)}$, $Y_{(0,1)}$, $Y_{(1,-1)}$, $Y_{(1,0)}$, and $Y_{(1,1)}$. Then, these relative luminance values may be combined to determine the relative luminance ("Y") of the selected root pixel. For example, an average or a median of the relative luminance values may be calculated and used as the relative luminance ("Y") of the selected root pixel.

If the color values of the selected root pixel (represented by the RGB vector "s") are linear, the perceptual luminance ("p") of the selected root pixel equals the relative luminance ("Y") of the selected root pixel. Otherwise, the relative luminance ("Y") may be linearized to obtain the perceptual luminance ("p") using the following formula:

$$p = \left(\frac{(Y + 0.055)}{1.055}\right)^{2.4} \quad \text{Eq. 3}$$

The perceptual luminance ("p") in the RGB color space may be used by the method 280 (see FIG. 2) for two reasons. First, the human eye is vastly more sensitive to green than any other color and the RGB perceptual luminance easily accounts for this sensitivity. Second, digital image sensors (e.g., included in the camera 204) that include an RGB color filter array ("CFA") configuration produce green channels that are lower in noise than their red and blue counterparts. By using the perceptual luminance ("p") to determine chrominance decay (or desaturate the root image 240), the method 280 (see FIG. 2) spares (or causes less decay in) higher-quality green-dominant colors in the root image 240.

Next, in block 292 (see FIG. 2), the noise decay module 230 creates a linear monochromatic RGB vector by setting the value of each of the R, G, and B elements of the linear monochromatic RGB vector equal to the perceptual luminance ("p").

$$\text{linear monochromatic RGB vector} = [p, p, p] \quad \text{Eq. 4}$$

In block 294 (see FIG. 2), the noise decay module 230 multiplies the linear monochromatic RGB vector by a relative-luminance weighted saturation bias ("o") to obtain a biased monochromatic RGB vector.

$$\text{biased monochromatic RGB vector} = [o*p, o*p, o*p] \quad \text{Eq. 5}$$

The relative-luminance weighted saturation bias ("o") may be calculated using the following formula:

$$o = 0.16667 \times \ln(p) + 1.0 \quad \text{Eq. 6}$$

In block 296 (see FIG. 2), the noise decay module 230 generates a new pixel of the denoised image 250 with new (desaturated) color values by blending the biased monochromatic RGB vector ([o*p, o*p, o*p]) with the RGB vector ([$R_{linear}$, $G_{linear}$, $B_{linear}$]) of the selected root pixel. In other words, the biased monochromatic RGB vector is multiplied by a first weight and the RGB vector is multiplied by a second weight wherein the first and second weights total one. The new color values are less saturated than the original color values associated with the selected root pixel. In particular, dim or less bright areas are more desaturated than brighter areas. Thus, the method 280 may be characterized as desaturating the selected root pixel and/or applying a weighted saturation to the selected root pixel.

Next, in decision block 298 (see FIG. 2), the noise decay module 230 determines whether all of the root pixels of the root image 240 have been selected in block 288 (see FIG. 2). The decision in decision block 298 (see FIG. 2) is "YES," when the noise decay module 230 has not yet selected all of the root pixels. When the decision in decision block 298 (see FIG. 2) is "YES," the noise decay module 230 returns to block 288 and selects a next root pixel from the root image 240.

On the other hand, the decision in decision block 298 (see FIG. 2) is "NO," when the noise decay module 230 has selected all of the root pixels. When the decision in decision block 298 (see FIG. 2) is "NO," the method 280 (see FIG. 2) terminates.

At this point, a new pixel has been generated for each of the root pixels. Combined, the new pixels define the denoised image 250. Optionally, the denoised image 250 may be remapped to a different color space. For example, the linear RGB values may be remapped to the sRGB color space. The denoised image 250 may be subject to one or more additional operations, such as Gamma curve remapping, luma curve augmentation (shadow/highlight repair), histogram equalization, additional spacial denoise, RGB mixing, and lookup table application. Optionally, the denoised image 250 may be displayed to the user using the display 210.

The method 280 (see FIG. 2) desaturates the root image 240 (or linear bitmap) using the perceptual luminance ("p") assigned to each root pixel to reduce or minimize chroma noise in critically underexposed (or dark) areas of the root image 240. Darker regions are desaturated more than lighter areas, which may be characterized as progressively desaturating the very darkest pixels (where chrominance typically decomposes in low bit-depth images).

Referring to FIG. 2, the method 280 does not evaluate high-frequency chrominance of either the root pixel selected in block 288 or its neighborhood. Instead, the method 280 assumes that the occurrence of chrominant anomalies (or chroma noise) progressively increases as the perceptual luminance ("p") of the selected root-pixel (or its neighborhood) approaches zero. Therefore, the method 280 evaluates only the perceptual luminance ("p") of the selected root pixel (which may be the median relative luminance of its spatial neighborhood). The visual reduction of chrominance noise in darker sectors of the root image 240 is an incidental byproduct of the progressive desaturation process.

The method 280 decays the chrominance of the root image 240 and generates the denoised image 250 within the gamut of the original color space (e.g., the sRGB color space) of the root image 240.

Mobile Communication Device

Figure 3:
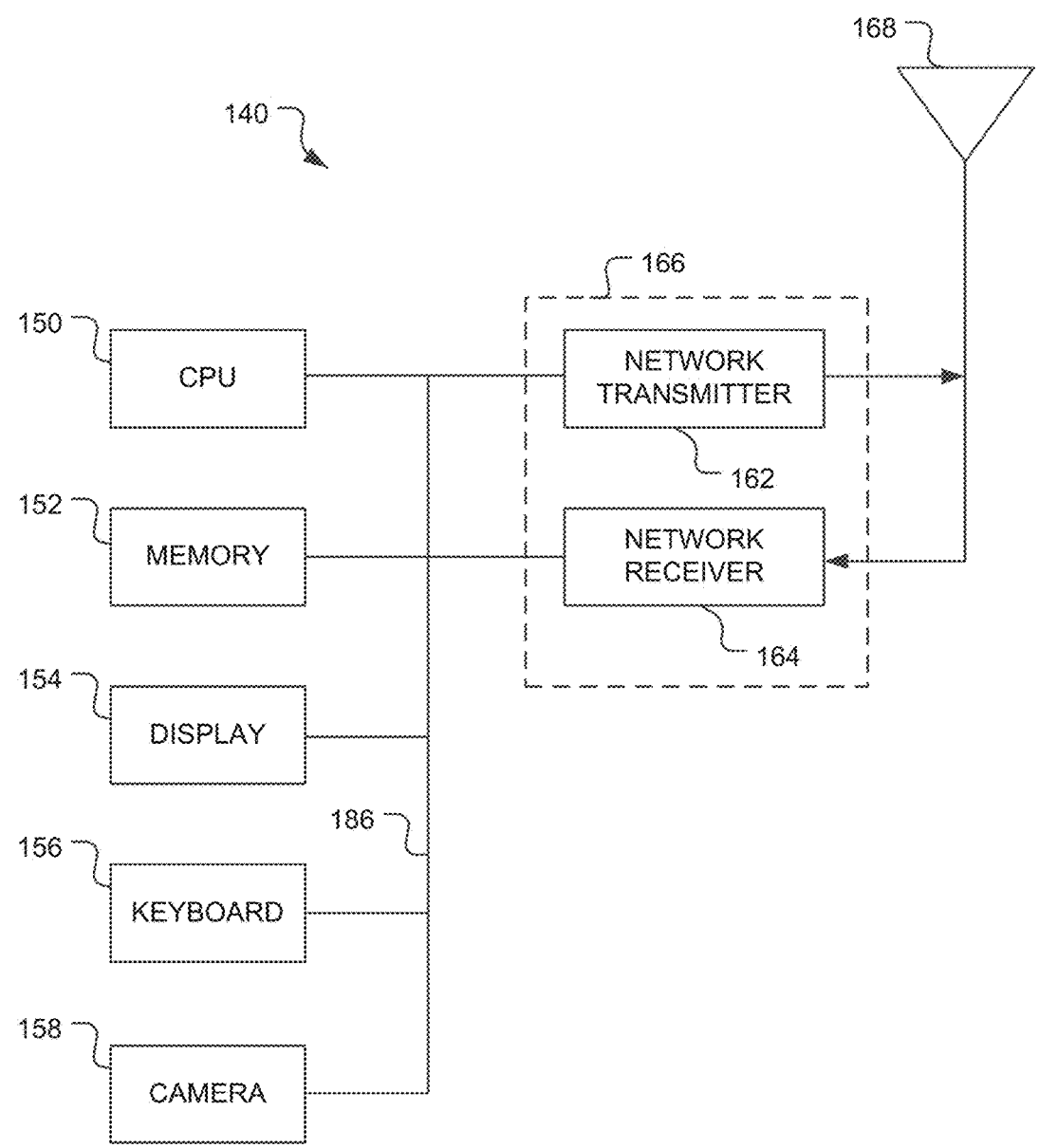
FIG. 3 is a functional block diagram illustrating an exemplary mobile communication device that may be used to implement the video capture system.

FIG. 3 is a functional block diagram illustrating a mobile communication device 140. The mobile communication device 140 may be implemented as a cellular telephone, smart phone, a tablet computing device, a self-contained camera module (e.g., a wired web camera or an Action Camera module), and the like. By way of a non-limiting example, the mobile communication device 140 may be implemented as a smartphone executing IOS or Android OS. The mobile communication device 140 may be configured to capture the digital video 203 (see FIG. 1) and process the digital video 203 as a RTMP protocol video stream.

The mobile communication device 140 includes the CPU 150. Those skilled in the art will appreciate that the CPU 150 may be implemented as a conventional microprocessor, application specific integrated circuit (ASIC), digital signal processor (DSP), programmable gate array (PGA), or the like. The mobile communication device 140 is not limited by the specific form of the CPU 150.

The mobile communication device 140 also contains the memory 152. The memory 152 may store instructions and data to control operation of the CPU 150. The memory 152 may include random access memory, ready-only memory, programmable memory, flash memory, and the like. The mobile communication device 140 is not limited by any specific form of hardware used to implement the memory 152. The memory 152 may also be integrally formed in whole or in part with the CPU 150.

The mobile communication device 140 also includes conventional components, such as a display 154 (e.g., operable to display the denoised image 250), the camera or video capture device 158, and keypad or keyboard 156. These are conventional components that operate in a known manner and need not be described in greater detail. Other conventional components found in wireless communication devices, such as USB interface, Bluetooth interface, infrared device, and the like, may also be included in the mobile communication device 140. For the sake of clarity, these conventional elements are not illustrated in the functional block diagram of FIG. 3.

The mobile communication device 140 also includes a network transmitter 162 such as may be used by the mobile communication device 140 for normal network wireless communication with a base station (not shown). FIG. 3 also illustrates a network receiver 164 that operates in conjunction with the network transmitter 162 to communicate with the base station (not shown). In a typical embodiment, the network transmitter 162 and network receiver 164 are implemented as a network transceiver 166. The network transceiver 166 is connected to an antenna 168. Operation of the network transceiver 166 and the antenna 168 for communication with a wireless network (not shown) is well-known in the art and need not be described in greater detail herein.

The mobile communication device 140 may also include a conventional geolocation module (not shown) operable to determine the current location of the mobile communication device 140.

The various components illustrated in FIG. 3 are coupled together by the bus system 186. The bus system 186 may include an address bus, data bus, power bus, control bus, and the like. For the sake of convenience, the various busses in FIG. 3 are illustrated as the bus system 186.

The memory 152 may store instructions executable by the CPU 150. The instructions may implement portions of one or more of the methods described above (e.g., the method 280 illustrated in FIG. 2). Such instructions may be stored on one or more non-transitory computer or processor readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system comprising:
   memory storing a digital video and a noise decay module, the digital video comprising a series of root images, the noise decay module comprising instructions; and
   at least one processor configured to execute the instructions that when executed cause the at least one processor to obtain a selected one of the series of root images and generate a denoised image based on the selected root image, the selected root image comprising a plurality of root pixels each associated with a set of color values,
   for each root pixel in the plurality of root pixels, the at least one processor generating the denoised image by:
   determining a perceptual luminance value for the root pixel based on (a) the set of color values associated with the root pixel and (b) the set of color values associated with each of a predetermined number of root pixels neighboring the root pixel, the set of color values associated with the root pixel being expressible as a color vector with a first plurality of elements, each of the first plurality of elements storing a different one of the set of color values,
   generating a monochromic vector for the root pixel, the monochromic vector having a second plurality of elements, each of the second plurality of elements equaling the perceptual luminance value,
   generating a biased monochromic vector by multiplying monochromic vector with a bias calculated as a function of the perceptual luminance value, and
   generating a new set of color values associated with a new pixel of the denoised image by blending the biased monochromic vector with the color vector.

2. The system of claim 1, further comprising:
   a camera configured to capture the digital video and store the digital video in the memory.

3. The system of claim 2, wherein the instructions cause the at least one processor to obtain each of the series of root images one at a time and generate a different denoised image for each of the series of root images in real-time as the digital video is captured.

4. The system of claim 1, wherein when each of the plurality of root pixels of the selected root image does not have linearized gamma values, the instructions cause the at least one processor to remap each value in the set of color values of each of the plurality of root pixels of the selected root image to a corresponding linear color value before generating the denoised image.

5. The system of claim 4, wherein the selected root image is in a Standard Red Blue Green ("sRGB") color space before the remapping occurs.

6. The system of claim 1, wherein the instructions, when executed by the at least one processor, cause the at least one processor to remap the denoised image to a Standard Red Blue Green (sRGB) color space after the denoised image is generated.

7. The system of claim 1, wherein the predetermined number of root pixels and the root pixel comprise nine root pixels.

8. The system of claim 1, wherein the root pixel and the predetermined number of root pixels are region pixels, and the perceptual luminance value for the root pixel is determined by:
   determining a plurality of relative luminance values by calculating a relative luminance value for each of the region pixels, and
   determining a median of the plurality of relative luminance values, the perceptual luminance value for the root pixel being the median.

9. The system of claim 8, wherein the relative luminance value is determined for each of the region pixels by:
   multiplying 0.2126 by a red component of the set of color values associated with the region pixel,
   multiplying 0.7152 by a green component of the set of color values associated with the region pixel, and
   multiplying 0.0722 by a blue component of the set of color values associated with the region pixel.

10. The system of claim 1, wherein the bias is calculated by multiplying 0.16667 with a natural log of the perceptual luminance value to obtain a result and adding one to the result.

11. The system of claim 1 implemented as a smartphone comprises:
    a camera configured to capture the digital video and store the digital video in the memory, the instructions causing the at least one processor to obtain each of the series of root images one at a time and generate a different denoised image for each of the series of root images in real-time as the digital video is captured.

12. A method comprising:

obtaining a selected one of a series of root images of a digital video with at least one processor, the selected root image comprising a plurality of root pixels each associated with a set of color values; and until each of the plurality of root pixels has been selected:

selecting, with the at least one processor, one of the root pixels, the set of color values associated with the selected root pixel being expressible as a color vector with a first plurality of elements, each of the first plurality of elements storing a different one of the set of color values, determining, with the at least one processor, a perceptual luminance value for the selected root pixel based on (a) the set of color values associated with the selected root pixel, and (b) the set of color values associated with each of a predetermined number of root pixels neighboring the selected root pixel, generating, with the at least one processor, a monochromic vector for the selected root pixel, the monochromic vector having a second plurality of elements, each of the second plurality of elements equaling the perceptual luminance value, generating, with the at least one processor, a biased monochromic vector by multiplying the monochromic vector with a bias calculated as a function of the perceptual luminance value, and generating, with the at least one processor, a new set of color values associated with a new pixel of a denoised image corresponding to the selected root pixel by blending the biased monochromic vector with the color vector.

13. The method of claim 12, further comprising:
capturing the digital video with a camera; and
storing the digital video in a storage location accessible by the at least one processor, the at least one processor obtaining the selected root image from the storage location.

14. The method of claim 12, further comprising:
determining, with the at least one processor, whether each of the plurality of root pixels of the selected root image has linearized gamma values; and
when it is determined that the plurality of root pixels of the root image do not have linearized gamma values, remapping each value in the set of color values of each of the plurality of root pixels of the selected root image to a corresponding linear color value.

15. The method of claim 14, wherein the selected root image is in a Standard Red Blue Green (sRGB) color space before the remapping occurs.

16. The method of claim 12, further comprising:
remapping, with the at least one processor, the denoised image to a Standard Red Blue Green (sRGB) color space after each of the plurality of root pixels has been selected.

17. The method of claim 12, wherein the predetermined number of root pixels and the selected root pixel comprise nine root pixels.

18. The method of claim 12, wherein the selected root pixel and the predetermined number of root pixels are region pixels, and the perceptual luminance value for the selected root pixel is determined by:
determining, with the at least one processor, a plurality of relative luminance values by calculating a relative luminance value for each of the region pixels, and
determining, with the at least one processor, a median of the plurality of relative luminance values, the perceptual luminance value for the selected root pixel being the median.

19. The method of claim 18, wherein the relative luminance value is determined for each of the region pixels by:
multiplying 0.2126 by a red component of the set of color values associated with the region pixel,
multiplying 0.7152 by a green component of the set of color values associated with the region pixel, and
multiplying 0.0722 by a blue component of the set of color values associated with the region pixel.

20. The method of claim 12, wherein the bias is calculated by multiplying 0.16667 with a natural log of the perceptual luminance value to obtain a result and adding one to the result.

* * * * *